Dec. 3, 1963

V. JOSEPHSON 3,113,088

APPARATUS FOR THE GENERATION AND CONFINEMENT
OF HIGH KINETIC ENERGY GASES

Filed July 27, 1959

VERNAL JOSEPHSON
INVENTOR.

BY
ATTORNEYS

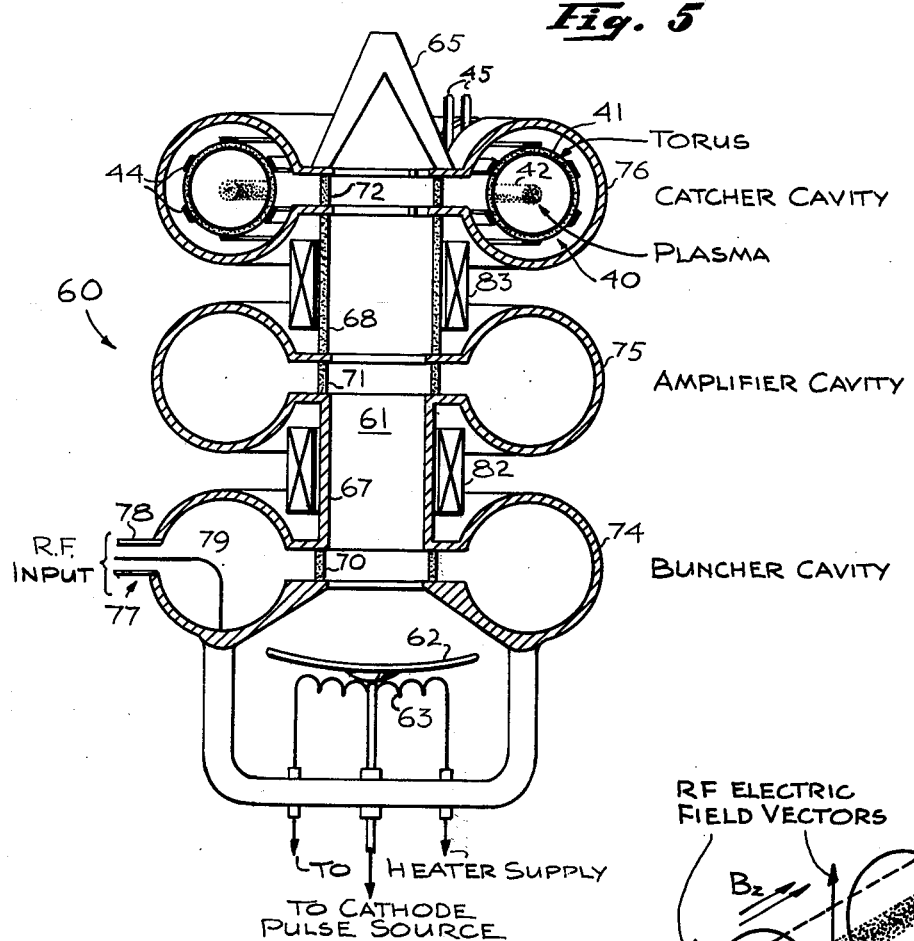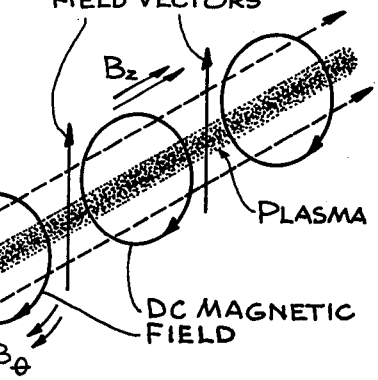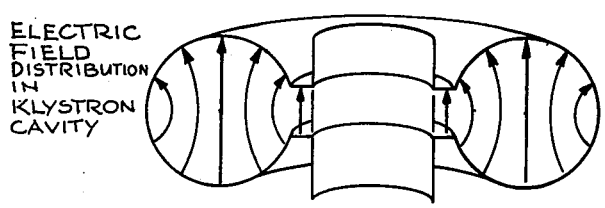

VERNAL JOSEPHSON
INVENTOR.

BY
ATTORNEYS

United States Patent Office 3,113,088
Patented Dec. 3, 1963

3,113,088
APPARATUS FOR THE GENERATION AND CONFINEMENT OF HIGH KINETIC ENERGY GASES
Vernal Josephson, Palos Verdes Estates, Calif., assignor by mesne assignments, to Space Technology Laboratories, Inc., El Segundo, Calif., a corporation of Delaware
Filed July 27, 1959, Ser. No. 829,681
15 Claims. (Cl. 204—193.2)

The present invention generally relates to the magnetohydrodynamics art and more particularly to apparatus for the generation and confinement of high kinetic energy gases.

It is a well established fact that high temperature gases are required to either investigate or initiate a thermonuclear reaction, or to provide neutrons. Since the temperatures involved in thermonuclear processes are of the order of $10^{8°}$ Kelvin, conventional heating techniques are not suitable for bringing the gases to the desired high temperature or energy levels.

It has been found possible to obtain the desired high temperatures or energy levels by accelerating particles of a gaseous medium to high kinetic energies and then highly compressing them or, stated differently, confining them to some small volume. By this technique, an ionized gas, often called a plasma, is contained within a selected volume and a high density current is then passed through the plasma. The current establishes accelerating magnetic fields which function to constrict or drive the plasma particles inwardly toward a central axis extending along the current path. The phenomenon by which magnetic fields function to drive the gas inwardly is usually referred to as the "pinch effect." A detailed description of the phenomenon may be found in an article by Rosenbluth entitled "Dynamics of a Pinched Gas", appearing at page 57 of a symposium entitled "Magnetohydrodynamics," published by the Stanford University Press in 1957.

After the initial establishment of the pinch effect, a problem hereafter generally arises in the stable containment of the pinched plasma. Various instabilities in the plasma itself and in the containment apparatus and technique have usually limited the existance of the pinch effect to extremely short periods. Accordingly, it is highly desirable to be able to employ methods for supplementing the "pinch effect" phenomena, that is, for further containing the pinched plasma. One method and apparatus for achieving such a result is shown and described in a co-pending application of Erich S. Weibel, entitled "Gas Confining Method and Apparatus," filed January 15, 1958, Serial No. 709,122. As described in that application, a plasma may be stably contained by the application of a radio-frequency magnetic field for the plasma in addition to the direct-current magnetic field which provides the pinch phenomenon. The above-mentioned co-pending application describes in detail how microwave energy may be utilized to provide the desired radio-frequency magnetic field for the plasma.

Devices which utilize both types of magnetic fields should preferably satisfy a number of other considerations. They should not, of course, interfere with the structure needed to initiate the pinch effect. Even more, however, they should permit efficient coupling of high radio-frequency power levels directly to the plasma load. In other words, the radio-frequency fields have previously been generated in one apparatus and thereafter coupled to the apparatus containing the plasma, thereby requiring a good impedance match between the two apparatuses in order to obtain an optimum power transfer. This has been particularly difficult to do because of the extremely low impedance characteristics of plasmas.

It is, therefore, a primary object of this invention to provide new and improved apparatus for the stable containment of a plasma by the combination of direct-current and radio-frequency magnetic fields.

It is another object of the present invention to provide improved apparatus for applying radio-frequency magnetic energy in a selected fashion to a pinched plasma.

The present invention overcomes the above and other disadvantages and limitations encountered in prior art apparatus by singularly disposing the plasma-containing chamber within the resonant cavity of a microwave signal general. According to the basic concept of the present invention, the chamber is made a part of the construction of the signal generator by including it in the resonant cavity design so that electromagnetic fields established in the cavity also simultaneously pervade the chamber. Impedance matching problems are thereby very considerably reduced and the over-all apparatus simplified and made more compact.

More particularly, in one form of the invention, a klystron having a resonant reentrant cavity concentrically encompasses a plasma-containing torus. A magnetic drive about the torus may be used to initiate a dense pinching current in the plasma, the drive being abruptly short-circuited at current maximum to cause a trapped current to flow in the plasma circularly about the torus. The pinch phenomenon results from an encompassing direct-current magnetic field about the current. The klystron, which may be of the reflex type, is caused to oscillate during the flow of the trapped pinched current in the plasma. The standing wave modes in the resonant cavity of the klystron produce the desired radio-frequency magnetic fields that extend through the torus around the plasma region. These radio-frequency magnetic fields are applied to the plasma in a direction that is preferably orthogonal with respect to the direct-current magnetic fields, both fields together insuring stable containment of the pinched plasma.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

FIG. 3 is a simplified representation of a portion of an arrangement in accordance with the invention, showing electric field distributions therein of the $TE_{01}$ mode;

FIG. 4 is a diagrammatic illustration of a plasma and the associated direct-current and radio-frequency magnetic fields which provide a stabilized pinch effect in accordance with the present invention;

FIG. 5 is a simplified sectional representation of another form of apparatus in accordance with the present invention.

Figure 1:
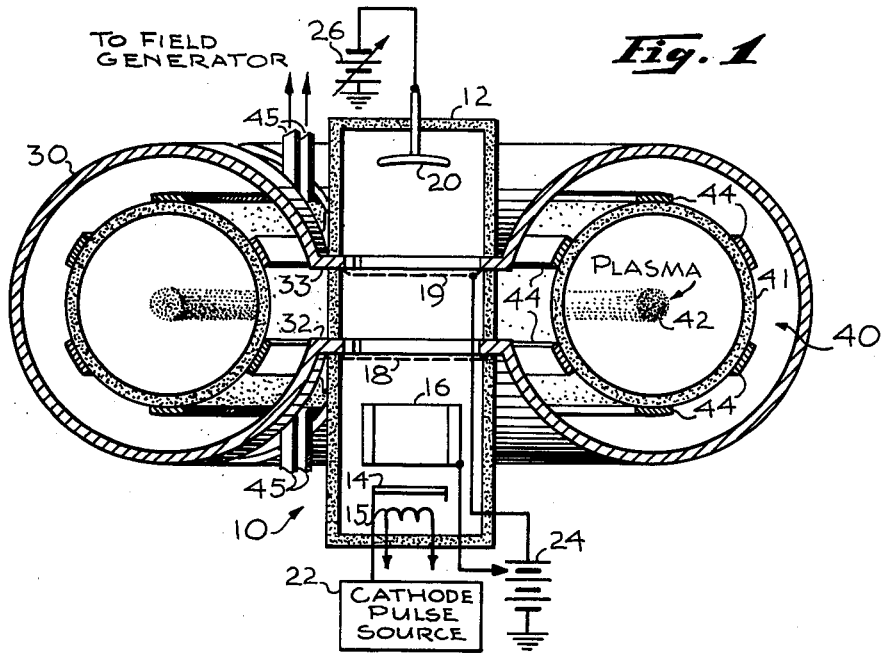
FIG. 1 is a sectional view, partly in schematic form, of one arrangement in accordance with the invention.

Referring now to the drawings, apparatus in accordance with the invention is shown which basically utilizes a microwave signal generator having a resonant cavity, a plasma-containment device positioned within the cavity, and circuits associated with the plasma-containment device for initiating heating of the plasma by means of pinched currents. The pinched currents are provided in such a way that the microwave fields are properly disposed to assist in containing the pinched plasma.

Figure 2:
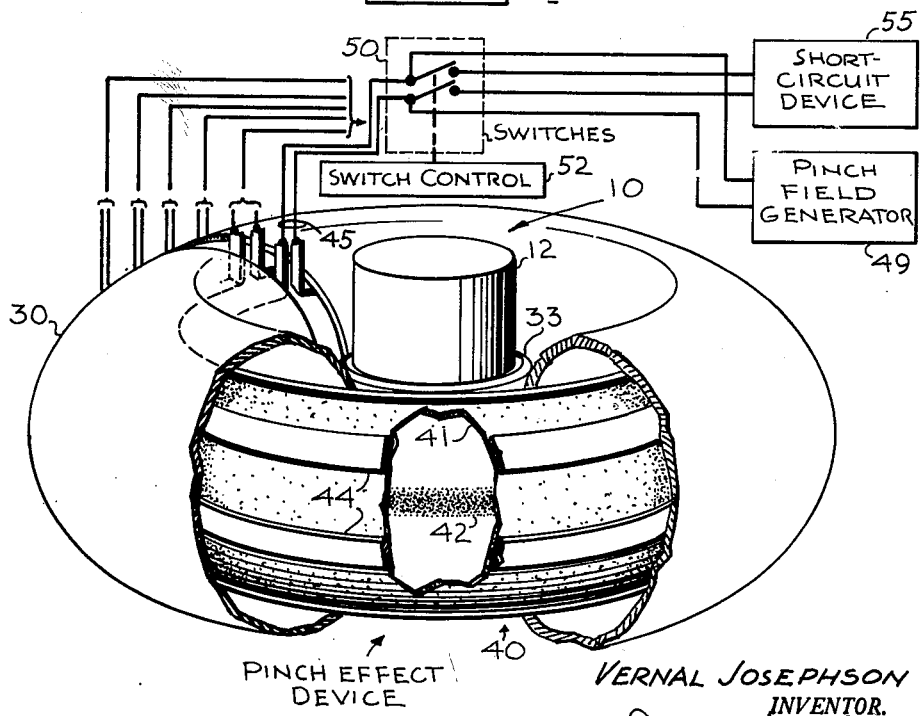
FIG. 2 is a simplified perspective view, partly broken away, of the arrangement of FIG. 1, combined with a block diagram of several associated elements as employed in a system in accordance with the invention.

Specifically, as seen in FIGS. 1 and 2, the microwave signal generator may consist of a klystron tube 10 concentrically disposed about a central axis. The klystron 10, shown in best detail in FIG. 1, is of the reflex type in this example, and has an electron discharge section along the central axis which operates with the klystron cavity to provide a velocity modulated stream of electrons. The electron discharge section includes an outer ceramic envelope 12 which is hermetically sealed. At what may be called the electron gun end, the device includes a cathode 14 having an associated heater filament 15 and an annular accelerating anode 16 spaced from the cathode and positioned along the central axis. In accordance with conventional reflex klystron design, a grid 18 and a perforated anode 19 are disposed adjacent the cavity section, and a repeller anode 20 is disposed within the envelope 12 at the opposite end from the cathode 14.

Various current and power supplies for the elements of the electron discharge section of the klystron 10 are shown, the supply for the heater filament 15 having been omitted for simplicity. The cathode 14 is coupled to a negative cathode pulse source 22 which is arranged to rapidly activate the cathode 14 and thus to control operation of the klystron. The accelerating anode 16 and the perforated anode 19 of the klystron 10 are both coupled to a positive direct-current voltage source 24. The repeller anode 20 is maintained at a negative potential through an adjustable negative direct-current voltage source 26. As in conventional klystron arrangements, variations in the voltage of the repeller 20 are utilized to control the frequency of oscillations of the klystron 10.

A resonant cavity for the klystron 10 is provided about the central axis principally by a hollow toroidal member 30 which is concentric with the central axis and which forms the inductance portion of the cavity. In one selected region or at separate selected points about its periphery, the toroidal member may be slotted radially in a non-radiating configuration for receiving electrical connections to the apparatus, as will be described below. The resonant cavity is completed by a pair of parallel radially extending plates 32, 33 which are affixed to the envelope 12 of the electron discharge section of the klystron and provide electromagnetic coupling to the interior of the envelope 12. The parallel plates 32, 33 define the capacitance region of the resonant cavity.

Apparatus for establishing the pinch effect is utilized in conjunction with the microwave generator. This pinch effect apparatus is generally designated 40 and includes a hollow torus 41 which is concentrically positioned within the toroidal cavity 30 of the klystron 10. The torus 41 is constructed of a material which is substantially transparent to microwave energy, but which is capable of containing a gaseous plasma at high temperatures and without contamination. A ceramic or a quartz (e.g. alumina) material is suitable for the torus 41. The plasma 42 contained within the torus 41 is indicated in a general way as a cloud of particles which consists of gas particles sufficiently ionized to render the medium electrically conductive.

What may be called a linear pinch drive is provided about the torus 41 by linear, as distinguished from helical, windings 44 about the torus 41. That is, each of the windings 44 is disposed along the length of the torus 41 concentrically with respect to the central axis of the apparatus. Taking a cross-section of the torus 41 as in FIG. 1, the windings 44 are seen to be regularly circumferentially spaced. To provide a relatively low inductance and resistance while at the same time maintaining a relatively high ratio of inductance to resistance, the windings 44 may be in the form of strips of a highly conductive material and are relatively large in cross-sectional areas. Each of the windings 44 is connected to the leads 45 which extend through non-radiating slots or apertures in the toroidal member 30 of the klystron 10.

As shown in FIG. 2, current for application of a high energy field to the pinch effect apparatus 40 is derived from a pinch field generator 49 which may comprise a bank of capacitors. A short-circuit device 55 is selectively coupled in parallel to the pinch field generator 49 through a set of switches 50 which are operated by a switch control 52. Elements which may be utilized for the pinch field generator 49 and the short-circuit device 55 are discussed in greater detail in conjunction with FIG. 6. It suffices here to say that the pinch field generator 49 is basically a high energy current source, while the short circuit device 55 operates at the proper time to provide a closed current loop for the windings 44. The proper time is selected by switch control 52 which may be a time delay device such as a relay or a delay line.

In operation, the arrangement of FIGS. 1 and 2 first generates a pinch effect in the plasma 42, and the provides stable containment of the pinched plasma through the operation of the microwave signal generator. While there is an integrated action between the various portions of the apparatus in providing the over-all result, the operation of the pinch effect device 40 may conveniently be considered first.

To initiate operation, the pinch field generator 49 passes a direct current through the windings 44 which very rapidly rises to a high magnitude. With the high conductivity of the windings 44 and the linear disposition of the windings 44 about the periphery of the torus 41, the result is a sharp rise in the current flow about the torus 41. The currents flowing in the linear windings 44 generate circular magnetic fields which extend into the region of the plasma 42. Accordingly, there is induced in the plasma 42 a current, concentric with the windings 44, that is to say, substantially along the axis of torus 41, but flowing in the opposite direction from the driving current in the windings 44. Maximum currents are desired because it is the magnetic fields generated by the drive currents about the plasma 42 current which give rise to the pinch effect in the plasma 42. These magnetic fields encircle the path of the plasma current and accelerate the particles of the plasma 42 inwardly in the phenomenon described in detail by Rosenbluth in the above-mentioned article.

When the current provided in the linear windings 44 has reached a maximum value, the switch control 52 acts to close the switches 50 whereby the short-circuit device 55 operates effectively to close the current of windings 44 around the torus 41. The proper moment for throwing the switch 50 is determined by switch control 52 which, it will be remembered, may be a time delay device. If it is, the time delay is adjusted so that control 52 will act when the current in windings 44 is a maximum, which means that the operating characteristics of the apparatus must be known beforehand. This technique of closing the current path to maintain current flow when reaching a maximum level has acquired the name "crowbarring," and has the objective of maintaining the maximum current level for as long as is practicable.

The currents in the linear windings 44 which remain after short-circuiting continue to flow for a time determined by the $$\frac{L}{R}$$

time constant of the windings 44. Thus, the desirability of having linear windings or conductors 44 of large cross-sectional area and low resistivity will be understood. The current flowing in the plasma 42 may thus be considered to be trapped or may be visualized as having a free-flowing direct-current characteristic for a time.

In order to precisely describe the nature of the direct-current magnetic field generated about the pinched plasma, it will be desirable to describe the field in some detail. The current in the plasma 42 follows a confined circular path within the torus 41. Nevertheless, for any relatively small segment along this path the pinched plasma may be considered to form a column. The term "encircling" is used to connote that as to this column the plasma is encompassed by a static magnetic field which is concentric with the column and in a plane transverse thereto. The application of a radio-frequency magnetic field which is orthogonal or crossed with respect to this direct-current magnetic field is important for gaining stability in confinement of the plasma, as is described in greater detail below.

Immediately subsequent to the "crowbarring" accomplished by the short-circuit device 55, the reflex klystron 10 is turned on by the cathode pulse source 22. This action initiates the operation of the electron gun within the klystron 10, to provide the stream of electrons which is to be velocity-modulated. For clarity, a brief description will be provided of the manner in which a velocity modulated electron stream results through operation of the klystron 10. Random disturbances in the electron stream give rise to some resonances in the region of the resonant cavity. Accordingly, electrons directed from the cathode 14 toward the grid 18 and the perforated anode 19 through the accelerating anode 16 are subjected to alternating fields. Those electrons which pass through the alternating field during the half cycle in which they are accelerated emerge from the perforated anode 19 with increased velocity. Those electrons which make their first transit through the resonant cavity area during the following half cycle are retarded. Such electrons emerge from the perforated anode 19 with decreased velocity. The repeller electrode 20 is maintained at a negative potential sufficient to return the electrons in a direction back toward the cathode. The electrons having high velocities, however, approach closer to the repeller 20 than those with the lower velocities. Hence, the higher velocity electrons take a longer time to return to the resonant portion of the klystron 10. Since these electrons left during an earlier portion of the cycle, however, they arrive at approximately the same time as those having the lower velocities. By proper adjustment of the negative supply 26 which is coupled to the repeller 20, the electrons can be made to return to the resonant cavity in bunches. Further, these bunches can be made to arrive at an instant in the cycle of the alternating field in the cavity such that they are retarded by the resonant cavity field. The electrons therefore undergo an energy interchange with the alternating field in which energy is delivered to the resonant cavity. If the power delivered to the resonant cavity exceeds the losses which are incurred both in the klystron 10 and in the coupled circuits, sustained oscillations take place. Thus, in the present device, the klystron oscillates at a frequency selected according to the size and configuration of the resonant cavity structure and the potential on the repeller 20.

The alternating fields established within the resonant cavity are preferably of the $TE_{01}$ mode and are represented as shown in the field distributions in the simplified diagrams of FIGS. 3 and 4. Within the toroidal member 30, therefore, the radio-frequency magnetic fields extend concentrically about the central axis. This relationship may be more clearly seen in the enlarged diagrammatic view of FIG. 3, in which the plasma current is again illustrated as a particle stream or column encompassed by the direct-current magnetic field. In FIG. 3, the electric vectors may be represented as vertically extending arrows, and the radio-frequency magnetic field as dotted lines which are normal to the direct-current magnetic field lines. Taking a columnar portion of the circular current path, the radio-frequency magnetic fields lie, in this region immediately adjacent the plasma 42, along lines parallel to the path of the plasma current. This may, for purposes of reference, be spoken of as the $B_z$ direction. The radio-frequency magnetic fields are thus crossed with respect to the direct-current magnetic field which encircles the plasma current, and which may be spoken of as being in the $B_\theta$ direction.

A description of the manner in which dynamic stability is established through the use of combined cross static and alternating magnetic fields is provided either in the above-mentioned co-pending application of Weibel or in an article entitled "Radiation Pressure Confinement, the Shock Pinch and Feasibility of Fusion Propulsion," by Milton U. Clauser and Erich S. Weibel, as reported on page 161 in the Proceedings of the Second United Nations International Conference on the Peaceful Uses of Atomic Energy, vol. 32, published by the United Nations in 1958. Reference may be made to that application or article for a description of the theoretical and practical considerations which make such a magnetic field relationship desirable. Briefly, however, it is shown that the combined use of radio-frequency $B_z$ and direct-current $B_\theta$ magnetic fields results, where $B_z > B_\theta$ in substantial reduction if not elimination of all of the principal instabilities affecting a pinched plasma. The so-called sausage, kink and flute instabilities are each prevented by this field configuration.

The present arrangement has the further advantage, moreover, of eliminating the need for separate coupling equipment to provide the desired radio-frequency magnetic field in the region of the plasma, an advantage brought about by the integrated relationship between the various structural elements. It will be recognized that the present confinement apparatus for the generation of extremely high kinetic energy within the plasma and the consequent temperature levels which are reached is of wide potential use in the generation of controlled radiation and in the understanding of magnetohydrodynamic processes.

Figure 6:
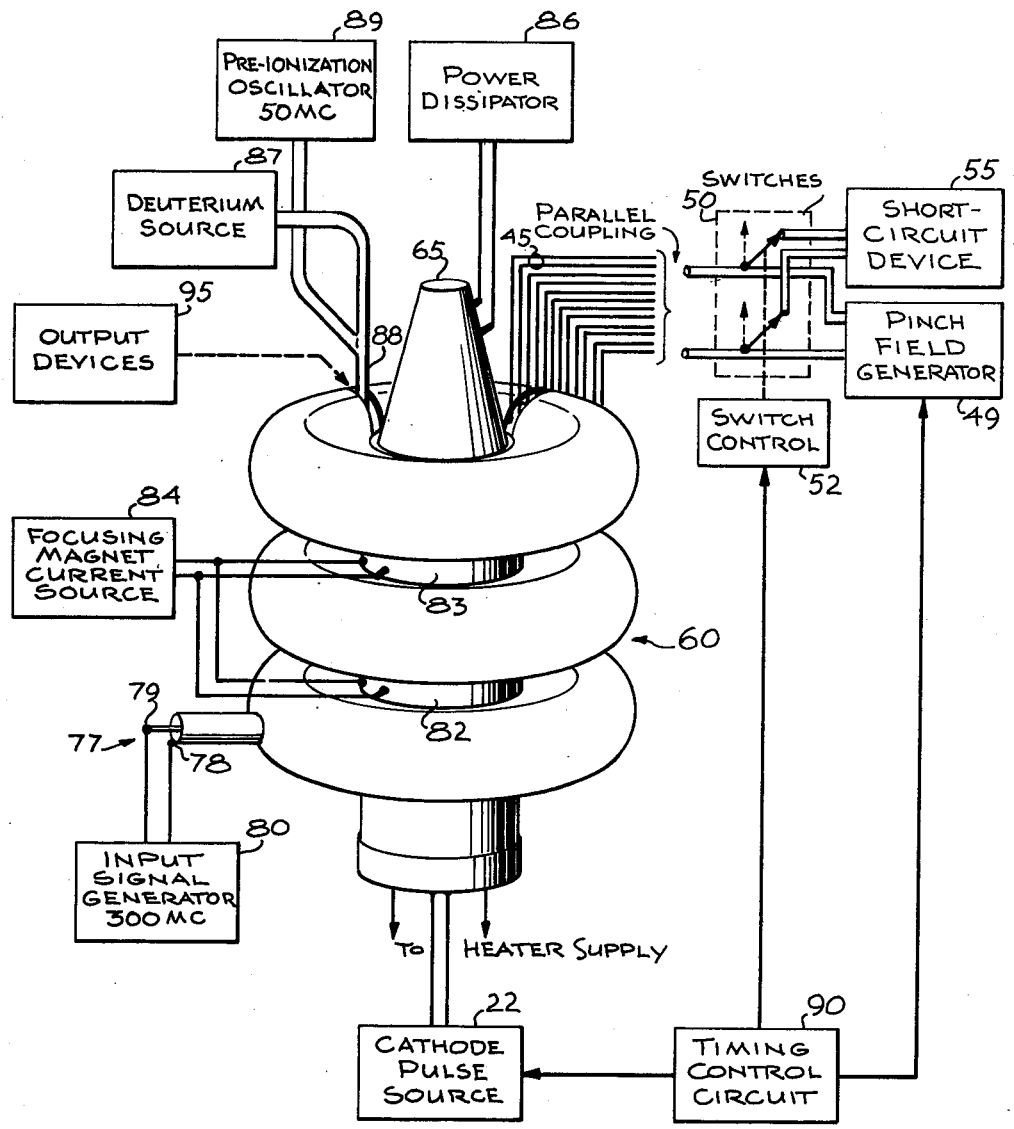
FIG. 6 is a perspective view of the arrangement of FIG. 5, showing also in block diagram form the principal units which may be employed therewith in a systems context.

A second form of apparatus in accordance with the invention is shown in FIGS. 5 and 6. FIG. 6 also shows a number of the elements which may be employed in an associated system. Both FIGS. 5 and 6 have been simplified for clarity, and where convenient to do so like parts have been given the same reference characters as in FIGS. 1 and 2.

The arrangement shown in FIGS. 5 and 6 utilizes a pinch effect device 40 of the type previously described, including a torus 41 having longitudinally encircling windings 44. A gaseous plasma 42 consisting of ionized particles is maintained within the torus 41. The pinch effect device 40, however, is illustrated as used in conjunction with a klystron cascade amplifier 60 instead of the reflex klystron previously described. The cascade amplifier 60 has a generally cylindrically shaped body portion or envelope 61 which extends along its central axis, which in turn coincides with the electron beam path. At one end of the cylindrical envelope 61 is the electron gun portion of the klystron 60, including a cathode 62 and associated heater filaments 63. At the opposite end of the tube from the electron gun is a dissipative beam sink 65 for dissipation of the currents and the kinetic energy generated by the electron stream.

The central portion of the envelope 61 of the klystron includes drift tube sections 67 and 68 which are successively positioned along the axis of the klystron 60. The spacings between the drift tube sections 67 and 68 provide axial apertures extending around the envelope. These axial apertures 70, 71 and 72 provide regions for coupling electromagnetic wave energy into three individually associated generally toroidal resonant cavities 74, 75 and 76, which are spaced along the electron stream at successively further distances from the electron gun portion. In accordance with klystron terminology, the first from the electron gun end of the cavity. 74 is termed the "buncher," the second cavity 75 is termed the "amplifier" and the third cavity is termed the "catcher" cavity 76.

Input signals are provided for this cascade amplifier arrangement from a probe formed from the center conductor 79 of a coaxial line 77 which is coupled to the buncher cavity 74. The outer conductor 78 of the coaxial line is coupled to the surface of the buncher cavity 74, while the probe is extended into a sidewall of the cavity. Input signals at a suitable frequency (in this case 300 megacycles) are provided from an input signal generator 80 which is coupled to the coaxial line 77. In the present arrangement, the pinch effect device 40 is positioned within the catcher cavity 76 of the cascade amplifier klystron 60. A toroidal configuration, similar to that previously described with respect to FIGS. 1 and 2, is utilized for the resonant cavities in the arrangements of FIGS. 5 and 6. The arrangement of the torus 41 and the external windings 44 about the torus 41, as well as the physical relationship of the torus 41 to the encompassing cavity 76, may be considered to be substantially the same as above described. The electron stream provided from the cathode 62 within the klystron envelope 61 is focused by a pair of focusing magnets, 82 and 83, each of which is positioned around a different drift tube 67 or 68 along the axis of the klystron 60. The magnets 82 and 83 are energized by a current source 84, best seen in FIG. 6.

The operation of this device in providing a pinched plasma, and in coupling the radio-frequency magnetic field to the plasma in the desired direction, is essentially the same as that described with respect to FIGS. 1 and 2. The generation of the radio-frequency magnetic field, however, is dependent on the somewhat different mode of operation of the cascade amplifier klystron 60. Since the operation of klystron tubes is well known, only a brief description of the operation of the cascade amplifier klystron 60 will be provided, to demonstrate the manner in which the desired modes are excited within the catcher cavity 76 so as to surround the plasma in the desired radio-frequency magnetic field.

The successive cavities 74, 75 and 76 of the klystron are separated by selected distances, and are maintained at selected potentials. A beam of random velocity electrons emitted from the cathode 62 is accelerated in the direction of the beam sink 65 by a positive potential on the buncher cavity 74, which serves as an anode. The standing waves in the buncher cavity 74 act upon the random-velocity stream to change the speed of some of the electrons in the electron stream. The electron stream passes out of the buncher cavity 74 into a field free space and then into the region of the second or amplifier cavity 75. The amplifier cavity 75 has no external connection but is excited by the bunched beam in such a way that it produces further bunching of the beam. Accordingly, the electron stream passes out of the region of the amplifier cavity 75 through another field free space at the second drift tube 68 and into the region of the catcher cavity 76. At the catcher cavity 76 the energy of the bunched electrons in the stream interacts with the standing waves excited in the cavity 76. Accordingly, the energy of the electrons contributes to the excitation of the desired modes in the catcher cavity 76. The electron stream is ultimately absorbed at the dissipative beam sink 65.

The fields which are generated in the catcher cavity 76 correspond to those generated in the cavity of the reflex klystron of FIGS. 1 and 2. Selection of one of these two techniques for the generation of the radio-frequency magnetic field is therefore dependent upon size, power requirements as discussed in more detail below, and whether or not a self-oscillating system is desired. In this respect it should be noted that a feedback loop may be employed so that the cascade amplifier klystron 60 of FIGS. 5 and 6 may be made self-oscillating if desired.

Reference may now be made specifically to FIG. 6 for an understanding of the manner in which the associated elements may be arranged in the illustrative embodiment there described. With respect to the klystron 60, a cathode pulse source 22 and a heater supply (not shown) may be employed in the same manner as in the arrangement of FIG. 1. A power dissipator 86 may be coupled to the beam sink 65. The generated current in the beam sink 65 may be substantial, and accordingly the power dissipator 86 may consist of a conductor with associated heat dissipation elements, such as a water-cooled conical copper heat sink.

For the operation of the pinch effect device 40, the elements employed to generate the currents utilized in creating the pinch effect are the same as in the arrangement of FIG. 1. That is, the adjacent terminal leads 45 from the windings 44 about torus 41 are coupled to a pinch field generator 49 and selectively to a short-circuit device 55 through use of a switch control 52. It should be noted that for simplicity of representation, the parallel coupling of the various leads 45 from the windings 44 have not been shown, but that instead only a single pair of leads have been illustrated along with the associated switches. The term "pinch field generator" is not intended to indicate that the generator 49 is any particular type of generator device. A suitable arrangement is an array of parallel low inductance high voltage condensers, each of which is coupled to a different one of the windings 44 about the torus 41. A suitable value for the arrangement shown and under conditions to be hereafter described in more detail employs six 0.5 microfarad, 25 kilovolt units as the condensers.

For the short circuit device 55, it is desired to employ apparatus which will permit the current flowing within the windings 44 and along the pinched plasma to flow at a substantially constant value for a sufficiently long period. It has been found that a bank of condensers of 2000 microfarads charged to approximately 2 kilovolts provides an essentially infinite current source when connected in parallel with the pinch field generator 49. The condensers required for such a short-circuiting operation must have a voltage rating sufficient to accommodate the energy from the high voltage bank of condensers in the pinch field generator 49.

A suitably ionized gas is provided as the plasma within the torus 41 by a source of deuterium 87 which is coupled through a gas port 88 into the interior of the torus 41. A preionization oscillator 89 may be coupled into the path of the gas at the port 88 for the purpose of making the gas conductive. It has been found that a 500 watt, 50 megacycle oscillator coupled by probes, which are not shown in detail, to the port 88 will provide the desired percentage of ionization. The torus 41 may also utilize a separate pumping probe (not shown) for the purpose of evacuation, and a probe excited by the preionization oscillator 89 may also be used at this juncture if it is employed.

The timing control circuits 90 may comprise simple switching circuits for establishing the proper sequence of operation. The sequence of operation which is provided by the timing control circuits 90 is to initiate operation of the device by discharging the condensers or other energy storage mechanisms in the pinch field generator 49, thereafter to operate the switch control 52 so that the switches place the short circuit device 55 in parallel with the pinch field generator 49, and immediately thereafter to turn on the klystron 60 by actuating the cathode pulse source 22.

In the operation of the system, the following sequence may be observed in a practical embodiment. First, the deuterium source 87 may be adjusted to feed deuterium gas into the torus 41 at a selected rate, as the preionization oscillator 89 is operated to ionize the gas so that it becomes sufficiently conductive. At the same time, the power dissipator 86, the focusing magnet current source 84 and the input signal generator 80 may be operated continuously. To initiate operation of the pinch device, therefore, the energy is provided from the pinch field generator to the windings 44 about the torus 41. The resulting high current and the encircling $B_\theta$ direct-current magnetic field about the plasma column result in the creation of the pinch effect. At the time of maximum current from the pinch field generator 49, the short circuit device 55 is placed in parallel to furnish an essentially infinite current source which compensates for power dissipation in the pinch field generator mechanism 49. The short circuit device 55 is actuated approximately one microsecond following the actuation of the pinch field generator 49, and maintains the desired direct-current magnetic field about the plasma as described with reference to FIG. 1. At the time the pinch field is energized, the cathode pulse source 22 is also energized. It has been found that a −150 kilovolt supply of 50 amperes for 100 microseconds is compatible with the operation of the remainder of the system. Thus, during this period, the klystron 60 generates the radio-frequency magnetic fields in the $B_z$ direction to complement the $B_\theta$ static fields generated about the trapped plasma. This apparatus therefore generates the pinch effect and the desired high temperature from a high kinetic energy plasma in the manner previously described.

The use of output devices has been indicated only generally by a box 95 so labeled in FIG. 6 and coupled by a dotted line to the opening in the catcher cavity through which the deuterium gas is applied. A wide variety of such devices may be used singly or in combination, and accordingly their use will be understood and need not be discussed in detail. For example, sapphire windows may be employed at selected spacings from the gas ports, if it is desired merely to observe the manner in which the plasma is pinched and the pinch effect is contained. With such windows the output devices 95 may consist of cameras and various instrumentation equipment for measuring the temperature and density of the gas. Detectors may also be employed to measure electromagnetic radiation and nuclear radiation effects. Where conditions permit the maintenance of temperatures sufficiently high to induce thermonuclear reactions, heat conversion equipment may be associated with the catcher cavity. It is also worthwhile to note that a direct conversion of the plasma temperature to electrical energy may take place due to the interaction between the field in the cavity within the plasma is contained and the electron stream. In such case the beam sink would serve as the output from the system.

With this arrangement, it is deemed possible to generate temperatures of $10^{6\circ}$ Kelvin and densities of $10^{14}$ particles per cubic centimeter for approximately 100 microseconds. A suitably designed three cavity klystron with 40 db gain and 40% conversion efficiency provides approximately 6 megawatts of power in the $B_z$ field around the plasma.

While the details of these arrangements may be resolved in different ways, it may be helpful to point out a number of considerations which will affect the design. Because the fast pinch is applied to gas which is not completely ionized, and because of improvements gained with higher plasma densities, the driving voltage which is supplied by the pinch field generator may be made higher than that required under other circumstances. It may also be desirable to design the driver cavities in a cascade amplifier klystron so that they are tuned to a slightly higher frequency than that of the plasma containing cavity. Because the plasma reduces the inductance of the catcher cavity, and hence raises its resonant frequency, an increase in the size of the plasma will cause the frequency of the catcher cavity to be brought closer to that of the driver cavities, thus increasing the efficiency of the amplifier. Furthermore, the catcher cavity which contains the pinch effect device may be divided along four equally spaced apart radii into like cavity parts. This maintains the field distributions within the cavity such that the radio-frequency magnetic fields are not distorted into other directions.

A number of alternative arrangements will suggest themselves to those skilled in the art. For example, an automatic frequency control circuit may be utilized to maintain the driver cavities tuned to the frequency of the catcher cavity. The power required to establish the desired radio-frequency fields within the cavity may be reduced by cryogenic cooling of the cavities so as to increase the cavity wall conductivity. Moreover, although both reflex klystron and cascade amplifier klystrons have been described, it will be appreciated that other forms of radio-frequency amplifiers, including other forms of klystrons, may be utilized where desired. Essentially, the arrangement may be utilized in any device providing the desired field configuration, such as the general class of devices utilizing re-entrant type cavities. Furthermore, in connection with the cascade amplifier of FIGS. 5 and 6, it will be recognized that such amplifiers can be made and used having more than the three cavities shown.

Finally, by way of example, design features of a device of the type shown in FIGS. 5 and 6 are presented in the following table.

*Characteristics and Dimensions of Assembly*

| | |
|---|---|
| Frequency of $B_z$ field | 400 mc./sec. |
| Plasma temperature | $10^6$ deg. |
| Initial plasma density | $10^{14}$ particles/cc. |
| RF $B_z$ field power (peak) | 6 mw. |
| RF input | 600 watts. |
| Electron gun | 150 kv. 100 ampere. |
| Pulse length (containment time) | 100 μsec. |
| D.C. $B_\theta$ field energy source for heating and 2000 μf. 2 kv. for holding | ~3 μf. 25 kv. |
| Cavity radius (major) | 14.1 cm. |
| Cavity radius (minor) | 9.4 cm. |
| Beam diameter | 8 cm. |
| Gap spacing | 8 cm. |
| Number of cavities | 3. |
| Drift tube length | ~20 cm. |
| Torus radius (major) | 14.1 cm. |
| Torus radius (minor) | 7 cm. |
| Preionization | ~500 watts, 50 mc./sec. |

Although there have been described above and illustrated in the drawings particular arrangements of the invention for stably containing a pinched plasma through the use of a radio-frequency generator which is integrally associated with the plasma, it will be appreciated that the invention is not limited to the specific illustrative arrangements. Accordingly, any modifications, variations or equivalent arrangements falling within the scope of the annexed claims should be considered to be a part of the present invention.

Having thus described the invention, what is claimed is:

1. A system for combining crossed magnetic fields to establish a continuing pinch effect in a plasma, the system including in combination a torus defining a plasma containment member, a magnetic device about the torus for inducing a high density current in the plasma so as to initiate a pinch effect and a first magnetic field encompassing the current, and a symmetrically and centrally disposed velocity-modulated oscillator device including a resonant cavity encompassing the torus and electromagnetically coupled to the plasma within the torus for exciting standing waves therein to provide second magnetic fields which are orthogonal with respect to the first magnetic field encompassing the plasma current.

2. Apparatus for providing stable confinement of a gaseous plasma in a high kinetic energy condition including the combination of a device defining a resonant cavity and within which a gaseous plasma is maintained, means coupled to the cavity for establishing a current in the gaseous plasma along a selected path within the cavity, and an electron device including a velocity modulated electron stream source electromagnetically coupled to the resonant cavity for providing alternating magnetic fields therein substantially parallel to the selected path.

3. Apparatus for providing stable confinement of a gaseous plasma, the particles of which have high kinetic energies, the apparatus including in combination a resonant cavity microwave structure including a hollow internal member within which a gaseous plasma is maintained, a magnetic drive device including conductors between the resonant cavity and the hollow internal member for establishing a high density current in the gaseous plasma, the current being directed along a selected path and generating an encircling magnetic field, and a reflex-operated electron discharge device providing a velocity modulated electron stream electromagnetically coupled and interacting with the resonant cavity for providing radio-frequency magnetic fields therein which are crossed with respect to the encircling magnetic fields about the current.

4. Apparatus for providing and maintaining a pinched plasma to provide high kinetic energy levels including in combination a device defining a resonant cavity, a containment device within the cavity and including ionized gas particles, a magnetic source coupled to the containment device for inducing a current in the plasma of sufficiently high density to create a pinch effect, the current extending along a selected path and generating static magnetic fields therearound, an oscillator device coupled to the resonant cavity, the oscillator device providing a stream of velocity modulated electrons which are electromagnetically coupled to the resonant cavity, and exciting standing waves in the resonant cavity to provide alternating magnetic fields which are substantially along and about the selected path of the current in the ionized gas particles.

5. Apparatus for stably providing a pinched plasma including in combination a toroidal structure defining a resonant cavity containing a plasma, means coupled to the resonant cavity for inducing a current in the plasma of sufficient density to establish a pinch effect, the current extending along a selected path and generating a magnetic field which encircles the path, and a microwave oscillator coupled to the resonant cavity structure and exciting standing waves therein having selected electric vector components relative to the path of the current in the plasma.

6. Apparatus for providing high kinetic energies in a charged particle plasma, the apparatus including a toroidal member defining a resonant cavity and maintaining a plasma therewithin, a magnetic circuit coupled to the plasma within the cavity for inducing a current therein which describes a circular path concentric with the toroidal member, the current being sufficiently dense to create a pinch effect and to generate an encompassing magnetic field about the path, and a radio-frequency energy source electromagnetically coupled to the resonant cavity for exciting standing waves therein.

7. A system for providing an extremely high kinetic energy flow in a plasma including in combination a microwave device having a toroidal resonant cavity structure within which radio-frequency electromagnetic energy is established, means mounted within said structure for containing a gaseous particle plasma, and means coupled to the containing means for establishing a pinch effect in the plasma.

8. Apparatus for initiating and maintaining a pinched plasma including in combination a torus member containing a gaseous plasma, a magnetic drive source coupled to the gaseous plasma within the torus for inducing a current therein of sufficient density to initiate a pinch effect, the current path peripherally around and within the torus member, and an oscillator device centrally disposed with respect to the torus member and including a toroidal resonant cavity encompassing the torus member, the oscillator device generating signals at a frequency at which the cavity is resonant, and the cavity being electromagnetically coupled to the plasma to establish magnetic fields extending peripherally around the torus member concentric with and parallel to the pinched plasma current.

9. Apparatus for providing stable confinement along a given path of a gaseous plasma having high kinetic energy, the apparatus comprising in combination a torus member within which the gaseous plasma is contained, a reflex klystron centrally disposed with respect to the torus member and including a resonant cavity encompassing the torus member, a linear magnetic drive positioned about the torus member and operating to induce a current in the plasma of sufficient density to provide a circular current having a pinched effect about the torus member, and means for initiating operation of the klystron substantially concurrently with induction of the current in the plasma to establish magnetic fields at the plasma which are parallel to the circular current path.

10. Apparatus for generation of high temperature in a gaseous plasma including in combination a plasma containment member which is substantially pervious to microwave energy, conductors disposed about the containment member for inducing currents therein, means coupled to the conductors for discharging high level currents therethrough, means for abruptly short circuiting the conductors to provide a trapped current in the plasma, a microwave energy generator at least partially encompassing the containment member for providing radio-frequency magnetic fields having a selected relation to the current in the plasma, and switching means for operating the microwave energy generator upon the short circuiting of the conductors.

11. Apparatus for stably confining a high kinetic energy plasma and including in combination a reflex klystron device having a resonant cavity defined by a peripheral toroidal member and a centrally disposed pair of parallel radial plates within the toroidal member, said toroidal member forming the inductance portion and said parallel plates forming the capacitance portion of the resonant cavity, said reflex klystron also including means positioned centrally therein for velocity modulating an electron stream, a plasma containment torus positioned within and concentric with the toroidal member of the reflex klystron and containing a plasma of electrically conductive ionized gas particles to be accelerated to a high kinetic energy, a number of conductive windings positioned about the plasma containment torus and between the torus and the toroidal member, said windings being concentric with the torus and spaced at different positions thereon, said windings terminating in adjoining leads, means coupled to the conductive windings for providing an abruptly short-circuited drive current flow therein to induce a trapped pinched current in the conductive plasma, and means synchronized to operate the reflex klystron upon the termination of the drive current applied to the conductive windings, said klystron being operated to excite the resonant cavity in a standing wave mode at a frequency at which the cavity is resonant, the standing wave mode establishing magnetic fields which extend peripherally around the torus symmetric with the plasma current and normal to the magnetic fields generated about the plasma current during the pinch effect operation.

12. Apparatus for stably confining a pinched gas including in combination a torus structure for containment of an ionized gas, a magnetic drive mechanism for inducing a trapped current in a circular path concentric with the torus in the ionized gas, the current being of sufficient level to create a pinch effect in the gas, thereby generating a static magnetic field extending circularly around the path of the current, means coupled to the magnetic drive circuit for providing a rapidly rising, abruptly short-circuited, current to the drive circuit to provide a trapped current in the gas, a reflex klystron oscillator having an outer toroidal member and an inner pair of parallel radial plates defining a resonant cavity therefor, said klystron also including an electron stream velocity modulation section located with respect to the parallel plates and to the toroidal member, said toroidal member defining the inductance portion of the resonant cavity and concentrically encompassing the torus and the magnetic drive therefor, and means for initiating operation of the reflex klystron when the current is trapped in the ionized gas for exciting standing waves in the resonant cavity with the electric vector of the standing waves in the inductance portion being normal to the plane of the circular current path, so that magnetic fields coupled to the ionized gas are established which are concentric with and lie about the circular current path substantially parallel to the path and normal to the static magnetic fields.

13. Apparatus for generating high temperatures from the kinetic energy of particles of a gaseous plasma, the apparatus including in combination a plasma containing torus having a hollow interior, the torus being substantially pervious to microwave energy and symmetrically disposed about a central axis, a linear pinch drive mechanism including conductive windings disposed concentrically about the central axis and spaced circumferentially about a transverse cross-section of the torus, each of the conductors being of a highly conductive, low resistance material and having a relatively large cross-section and terminating in adjacent leads, a high energy current source generating a high energy charge, switching means coupling the high energy current source to the conductors of the linear pinch drive, means coupled to the adjacent leads of the conductors for providing an effective short circuit therebetween, a reflex klystron device including a resonant cavity having an inductance portion defined by a toroidal member concentric with the torus and extending thereabout and a capacitive portion defined by parallel radial plates extending inwardly from the toroidal member toward the central axis, the reflex klystron also including a velocity modulated electron discharge device for providing a velocity modulated stream of electrons, the electron discharge device including an electron gun and a repeller electrode positioned along the central axis, the electron gun being controllably operable, the electrode stream in the electron discharge device being electromagnetically coupled to the resonant cavity, and timing and control means coupled respectively to the switching means for applying the high energy current to the conductors, to the short circuit means for thereafter short-circuiting the conductors to induce a trapped current in the plasma, and to the electron gun control for thereafter initiating operation of the reflex klystron.

14. Apparatus for imparting kinetic energy to ionized gas particles including the combination of a cascade amplifier klystron having successive toroidal cavities disposed along the klystron axis, an input circuit coupled to a first of the cavities for providing input signals which are to be amplified, a pinch effect device including a toroidal plasma containment member disposed within the final cavity of the klystron, and a high energy source coupled to the pinch effect device for inducing a plasma current therein.

15. Apparatus for imparting kinetic energy to ionized gas particles including the combination of a cascade amplifier klystron including an electron gun portion, a buncher cavity, an amplifier cavity and a catcher cavity mounted successively along the klystron axis, each of the cavities including a portion which is of essentially toroidal form concentrically disposed about the klystron axis, an input circuit coupled to the buncher cavity for generating oscillations therein, a plasma containing torus disposed within the catcher cavity and concentric with the klystron axis, conductors disposed about the torus within the catcher cavity and concentric with the klystron axis, a high energy source coupled to the conductors for providing a current therethrough of sufficient strength to induce a pinched plasma current and a $B_\theta$ magnetic field thereabout, and a pulse source connected to the electron gun portion of the klystron for initiating operation thereof substantially concurrently with the generation of the pinched plasma, to excite standing wave modes in the catcher cavity which establish $B_z$ magnetic fields with respect to the plasma.

References Cited in the file of this patent

UNITED STATES PATENTS

| | | |
|---|---|---|
| 2,826,708 | Foster | Mar. 11, 1958 |
| 2,919,370 | Giannini et al. | Dec. 29, 1959 |

FOREIGN PATENTS

| | | |
|---|---|---|
| 1,185,102 | France | Feb. 9, 1959 |

OTHER REFERENCES

Proceedings of the Second United Nations International Conference on the Peaceful Uses of Atomic Energy, vol. 32, United Nations, 1958, pages 82–91, 129–138, 324–332.

Volume 31 of above Proceedings, pages 282–287.

Principles and Applications of Waveguide Transmission, by George C. Southworth, D. Van Nostrand Co., N. Y., 1951, pages 536–546, 553, 554, 562.

Science, Aug. 15, 1958, vol. 128, No. 3320 (an article by Colgate et al.), pp. 337, 338, 342.